United States Patent
Atchison

(10) Patent No.: US 11,454,411 B2
(45) Date of Patent: Sep. 27, 2022

(54) ZONE AIR FLOW RATE ADJUSTMENT FOR AN HVAC SYSTEM

(71) Applicant: Johnson Controls Technology Company, Auburn Hills, MI (US)

(72) Inventor: Shaun B. Atchison, Wichita, KS (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 149 days.

(21) Appl. No.: 16/827,043

(22) Filed: Mar. 23, 2020

(65) Prior Publication Data

US 2021/0293435 A1    Sep. 23, 2021

(51) Int. Cl.
| | |
|---|---|
| F24F 11/49 | (2018.01) |
| F24F 3/044 | (2006.01) |
| F24F 11/64 | (2018.01) |
| F24F 11/65 | (2018.01) |
| F24F 11/72 | (2018.01) |
| F24F 11/77 | (2018.01) |
| F24F 11/79 | (2018.01) |
| F24F 13/02 | (2006.01) |
| G05B 15/02 | (2006.01) |
| F24F 140/40 | (2018.01) |
| F24F 110/10 | (2018.01) |

(52) U.S. Cl.
CPC ............. *F24F 11/49* (2018.01); *F24F 3/044* (2013.01); *F24F 11/64* (2018.01); *F24F 11/65* (2018.01); *F24F 11/72* (2018.01); *F24F 11/77* (2018.01); *F24F 11/79* (2018.01); *F24F 13/02* (2013.01); *G05B 15/02* (2013.01); *F24F 2110/10* (2018.01); *F24F 2140/40* (2018.01)

(58) Field of Classification Search
CPC .. F24F 11/49; F24F 3/044; F24F 11/64; F24F 11/65; F24F 11/72; F24F 11/77; F24F 11/79; F24F 13/02; F24F 2110/10; F24F 2140/40; F24F 13/10; G05B 15/02; G05B 2219/2614; Y02B 30/70
See application file for complete search history.

(56) References Cited

U.S. PATENT DOCUMENTS

| | | | |
|---|---|---|---|
| 5,535,814 A | 7/1996 | Hartman | |
| 7,320,362 B2 | 1/2008 | Nichols | |
| 9,638,466 B2 * | 5/2017 | Mellen | ...................... F27D 9/00 |
| 2008/0277486 A1 * | 11/2008 | Seem | ...................... F24F 11/30 |
| | | | 236/49.3 |

(Continued)

FOREIGN PATENT DOCUMENTS

JP    3275669 B2    4/2002

*Primary Examiner* — Ramesh B Patel
(74) *Attorney, Agent, or Firm* — Fletcher Yoder, P.C.

(57) ABSTRACT

A heating, ventilation, and/or air conditioning (HVAC) system includes processing circuitry configured to receive a plurality of air flow rates, in which each air flow rate of the plurality of air flow rates is associated with a zone of a plurality of zones of the HVAC system, determine a sum of the plurality of air flow rates is outside of a threshold range around a total output air flow rate, and, in response to determining the sum of the plurality of air flow rates is outside of the threshold range around the total output air flow rate, adjust an air flow rate of the plurality of air flow rates based on a comparison between the sum of the plurality of air flow rates and the total output air flow rate.

20 Claims, 8 Drawing Sheets

(56) References Cited

U.S. PATENT DOCUMENTS

| | | | |
|---|---|---|---|
| 2012/0253524 A1* | 10/2012 | Norrell | F24F 11/745 |
| | | | 700/277 |
| 2014/0277773 A1* | 9/2014 | Goldschmidt | G01F 25/00 |
| | | | 700/282 |
| 2016/0061797 A1* | 3/2016 | Kocher | G01N 33/0011 |
| | | | 702/24 |
| 2017/0023269 A1* | 1/2017 | Gevelber | F24F 11/62 |
| 2019/0383512 A1 | 12/2019 | McCune et al. | |

* cited by examiner

| ZONE | INDICATED AIR FLOW RATES | ADJUSTMENT VALUE | ADJUSTED AIR FLOW RATES | EXCESS AIR FLOW VALUE | EXCESS AIR FLOW RATES | ADJUSTED AIR FLOW RATES PLUS EXCESS AIR FLOW RATES |
|---|---|---|---|---|---|---|
| Z1 | INDICATED AIR FLOW RATE 1 | | ADJUSTED AIR FLOW RATE 1 | | EXCESS AIR FLOW RATE 1 | ADJUSTED PLUS EXCESS AIR FLOW RATE 1 |
| Z2 | INDICATED AIR FLOW RATE 2 | | ADJUSTED AIR FLOW RATE 2 | | EXCESS AIR FLOW RATE 2 | ADJUSTED PLUS EXCESS AIR FLOW RATE 2 |
| Z3 | INDICATED AIR FLOW RATE 3 | | ADJUSTED AIR FLOW RATE 3 | | EXCESS AIR FLOW RATE 3 | ADJUSTED PLUS EXCESS AIR FLOW RATE 3 |
| Z4 | INDICATED AIR FLOW RATE 4 | TOTAL OUTPUT AIR FLOW RATE / TOTAL INDICATED AIR FLOW RATE | ADJUSTED AIR FLOW RATE 4 | X | EXCESS AIR FLOW RATE 4 | ADJUSTED PLUS EXCESS AIR FLOW RATE 4 |
| Z5 | INDICATED AIR FLOW RATE 5 | | ADJUSTED AIR FLOW RATE 5 | | EXCESS AIR FLOW RATE 5 | ADJUSTED PLUS EXCESS AIR FLOW RATE 5 |
| Z6 | INDICATED AIR FLOW RATE 6 | | ADJUSTED AIR FLOW RATE 6 | | EXCESS AIR FLOW RATE 6 | ADJUSTED PLUS EXCESS AIR FLOW RATE 6 |
| Z7 | INDICATED AIR FLOW RATE 7 | | ADJUSTED AIR FLOW RATE 7 | | EXCESS AIR FLOW RATE 7 | ADJUSTED PLUS EXCESS AIR FLOW RATE 7 |
| Z8 | INDICATED AIR FLOW RATE 8 | | ADJUSTED AIR FLOW RATE 8 | | EXCESS AIR FLOW RATE 8 | ADJUSTED PLUS EXCESS AIR FLOW RATE 8 |
| | TOTAL CFM: TOTAL INDICATED AIR FLOW RATE | | TOTAL CFM: TOTAL ADJUSTED AIR FLOW RATE | | | TOTAL CFM: TOTAL ADJUSTED PLUS EXCESS AIR FLOW RATE |

FIG. 6

ZONE AIR FLOW RATE ADJUSTMENT FOR AN HVAC SYSTEM

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. In some embodiments, the HVAC system may be configured to supply air flow to multiple zones. For example, the HVAC system may provide various conditioning capabilities for each zone. In such embodiments, it may be desirable to regulate air flow supplied or delivered to each zone to maintain a performance of the HVAC system.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) system includes processing circuitry configured to receive a plurality of air flow rates, in which each air flow rate of the plurality of air flow rates is associated with a zone of a plurality of zones of the HVAC system, determine a sum of the plurality of air flow rates is outside of a threshold range around a total output air flow rate, and, in response to determining the sum of the plurality of air flow rates is outside of the threshold range around the total output air flow rate, adjust an air flow rate of the plurality of air flow rates based on a comparison between the sum of the plurality of air flow rates and the total output air flow rate.

In one embodiment, a tangible, non-transitory, computer-readable medium includes computer-executable instructions that, when executed by processing circuitry, cause the processing circuitry to receive a plurality of indicated air flow rates, in which each indicated air flow rate of the plurality of indicated air flow rates is associated with a zone of a plurality of zones of a heating, ventilation, and/or air conditioning (HVAC) system, determine a sum of the plurality of indicated air flow rates is outside of a threshold range around a total output air flow rate of the HVAC system, and adjust each indicated air flow rate of the plurality of indicated air flow rates to establish a plurality of adjusted air flow rates in response to the determination that the sum of the plurality of indicated air flow rates is outside of the threshold range around the total output air flow rate.

In one embodiment, a heating, ventilation, and/or air conditioning (HVAC) system includes a blower configured to output an air flow at an output air flow rate, ductwork fluidly coupling the blower to a plurality of zones of the HVAC system, and a control system configured to receive a plurality of indicated air flow rates, in which each indicated air flow rate is associated with a zone of a plurality of zones of the HVAC system, determine a sum of the plurality of indicated air flow rates is outside of a threshold range around the output air flow rate, and adjust each indicated air flow rate of the plurality of indicated air flow rates to establish a plurality of adjusted air flow rates in response to determining the sum of the plurality of indicated air flow rates is outside of the threshold range around the output air flow rate, and operate the ductwork to enable the air flow output by the blower to be supplied to each zone of the plurality of zones based on the plurality of adjusted air flow rates.

DRAWINGS

Various aspects of this disclosure may be better understood upon reading the following detailed description and upon reference to the drawings in which:

FIG. 6 is a table illustrating various air flow rates associated with respective zones, in accordance with an aspect of the present disclosure;

DETAILED DESCRIPTION

Figure 1:
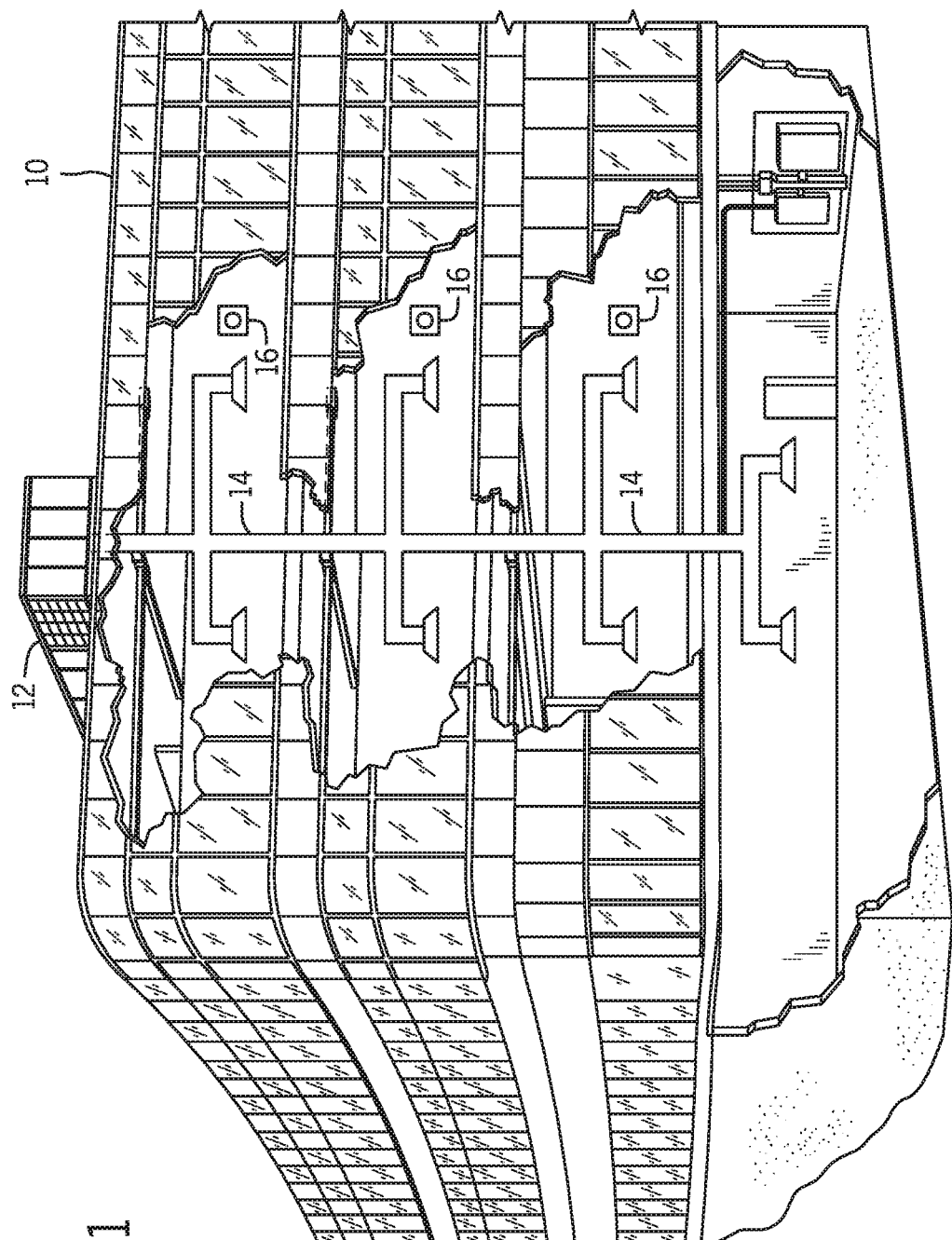
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system configured to supply an air flow to provide conditioning capabilities. The HVAC system may include various zones configured to receive a different flow rate of air to condition the zones in different manners and/or at different extents. For example, the HVAC system may supply conditioned air to a first zone at a greater air flow rate as compared to that supplied to a second zone in order to condition the first zone more quickly or efficiently. In certain embodiments, the rate or air flow supplied to each zone may be based on an amount of air flow that is available, such as a total air flow rate that a blower of the HVAC system may output. For instance, the HVAC system may distribute the total air flow rate to the zones to condition each zone to maintain a desirable comfort level of each zone.

In some implementations, an indicated rate of air flow that may be delivered to each zone may be set or designated during installation of the HVAC system. For instance, such air flow rates may be indicated by a user, by sensor data, by cloud data, or by any suitable input. However, such indicated air flow rates may not enable a desirable operation of the HVAC system. For instance, a sum of the indicated air flow rates may not be substantially equal to (e.g., is outside of a threshold range around) an actual available air flow rate (e.g., based upon erroneous installation or calculations). As a result, the HVAC system 150 may not efficiently operate. By way of example, if the total indicated air flow rate is substantially greater than the available air flow rate, the HVAC system may not be able to supply air flow to certain zones (e.g., when each zone is to be conditioned).

Thus, it is presently recognized that adjusting the indicated air flow rates may improve operation of the HVAC system. Accordingly, embodiments of the present disclosure are directed to systems and methods that compare the total indicated air flow rate to the available air flow rate in order to adjust the indicated air flow rates. For instance, the indicated air flow rates may be adjusted such that the total indicated air flow rate substantially matches with the available air flow rate. As such, the HVAC system may effectively distribute or otherwise utilize available air flow to condition the zones. Although the present disclosure primarily discusses adjusting air flow rates that are indicated during or before installation of the HVAC system, in additional or alternative embodiments, similar techniques may be applied to air flow rates indicated after installation of the HVAC system, such as during operation (e.g., by a resident), during maintenance (e.g., by a technician), and/or during any other suitable time after installation of the HVAC system.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
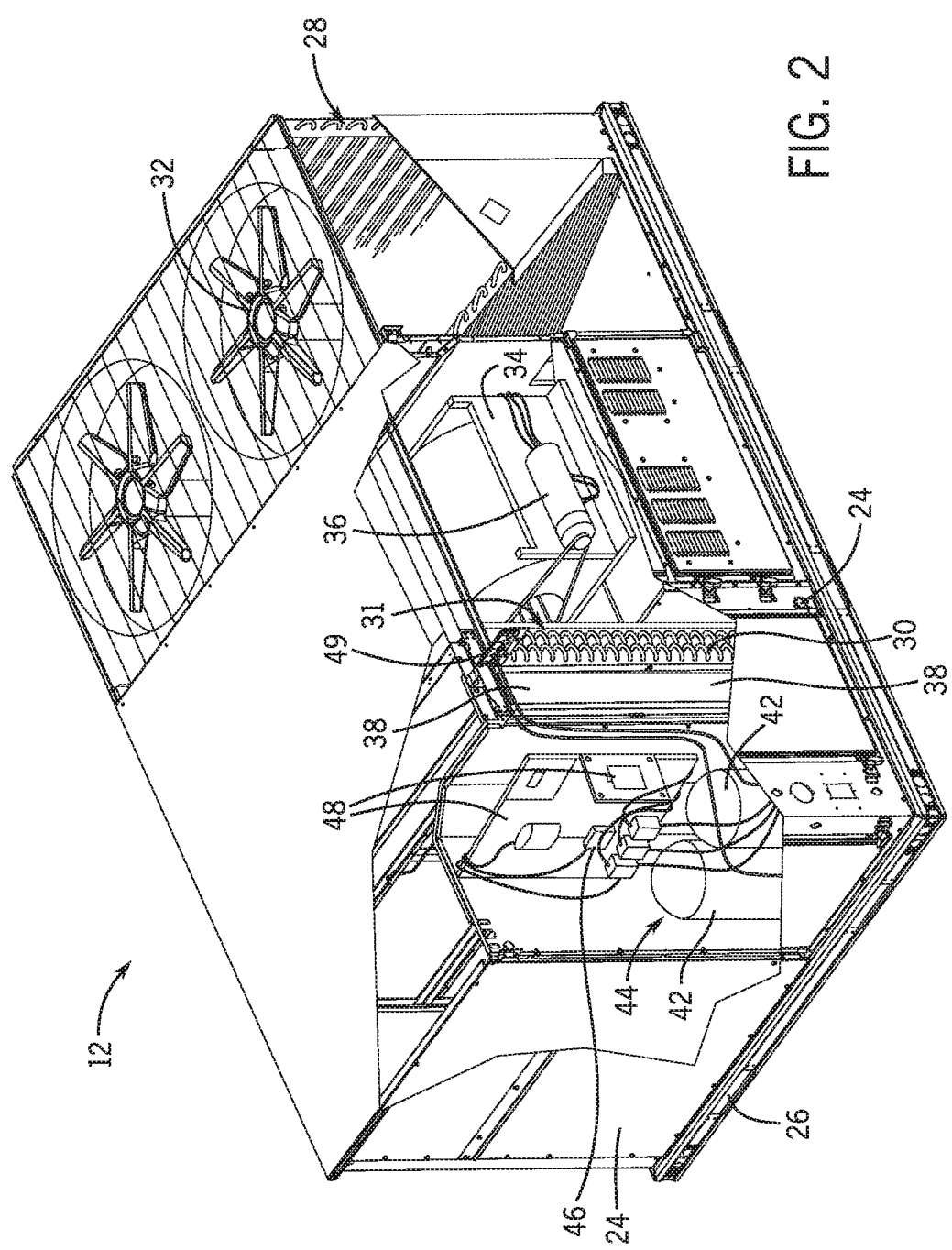
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
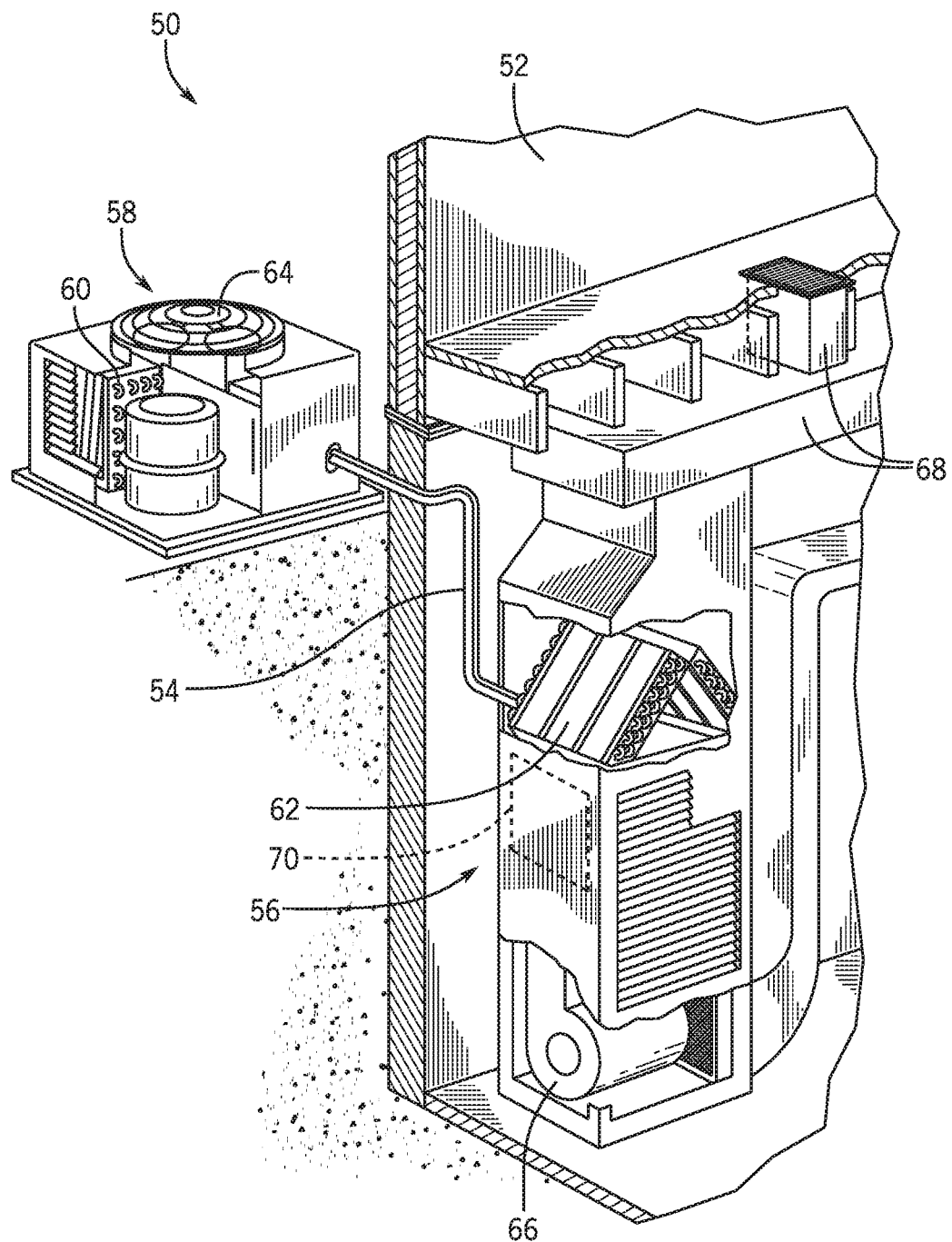
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
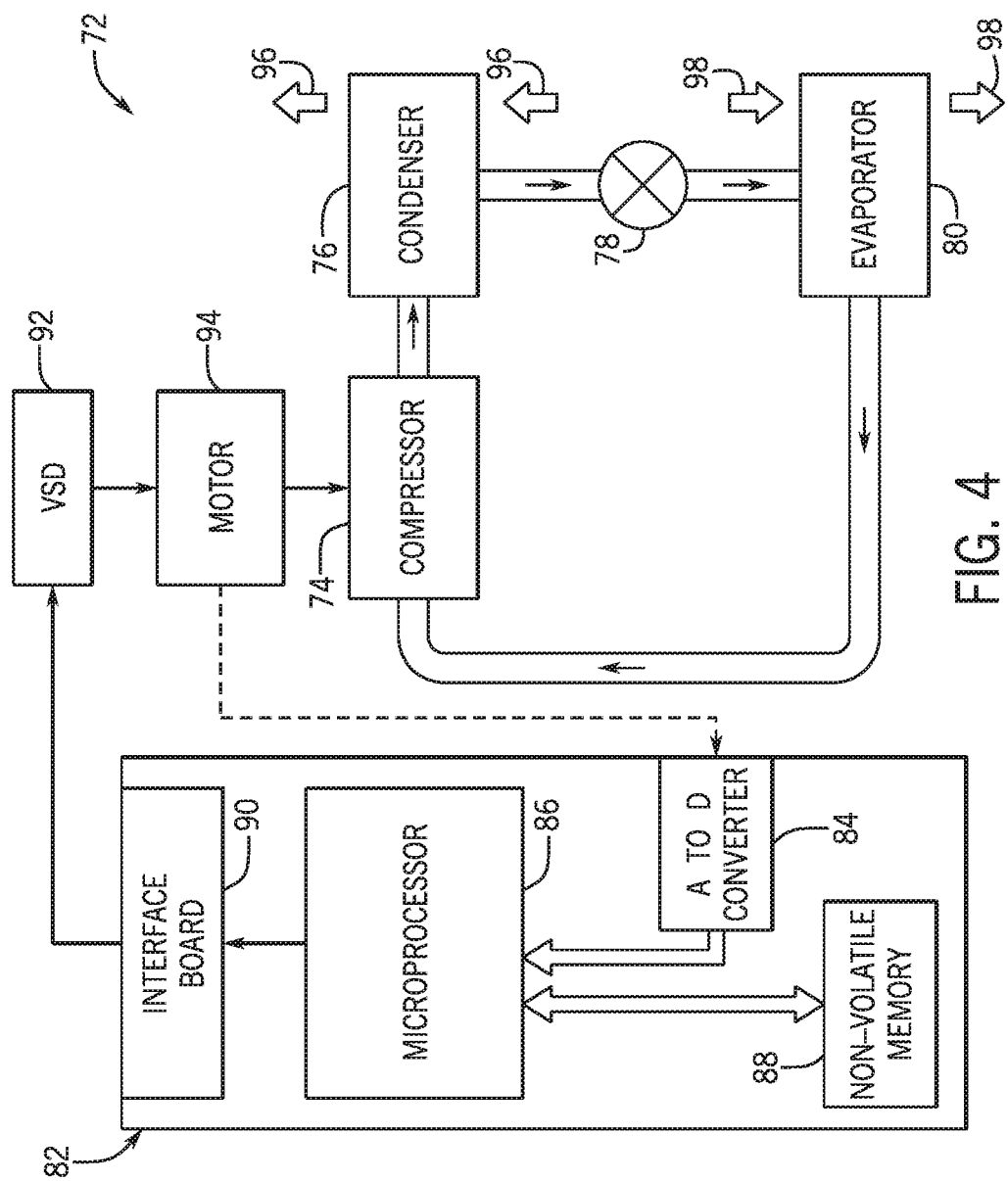
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system configured to supply respective air flows to different zones. In some embodiments, the HVAC system may receive an indication of respective rates of air flow to be supplied to the zones during conditioning of the zones. The HVAC system may adjust the indicated air flow rates to enable the HVAC system to operate more effectively to condition the zones. For instance, the indicated air flow rates may be adjusted such that a total air flow rate for the zones substantially matches with an available air flow rate. As a result, the HVAC system may better distribute the available air flow rate based on the indicated air flow rates associated with each zone and therefore operate more efficiently or effectively to condition the zones. In certain embodiments, the HVAC system may also adjust the rate of supplied air flow when there is an excess of available air flow. By way of example, certain zones may not have to be conditioned and therefore may not have to receive an air flow. Thus, there may be unused air flow that is available for distribution. The HVAC system may utilize this available air flow in a desirable manner to maintain a desirable or comfortable condition of the zones. For instance, the HVAC system may select the zones to which the available air flow is distributed based on whether the zone is currently being conditioned. In this manner, the HVAC system may maintain a comfort level of each zone without having the excess air flow continuously build up or increase, without having to implement additional equipment (e.g., a bypass damper) to reduce excess air flow, and so forth, to accommodate the excess air flow. Thus, management of available air flow may be improved.

Figure 5:
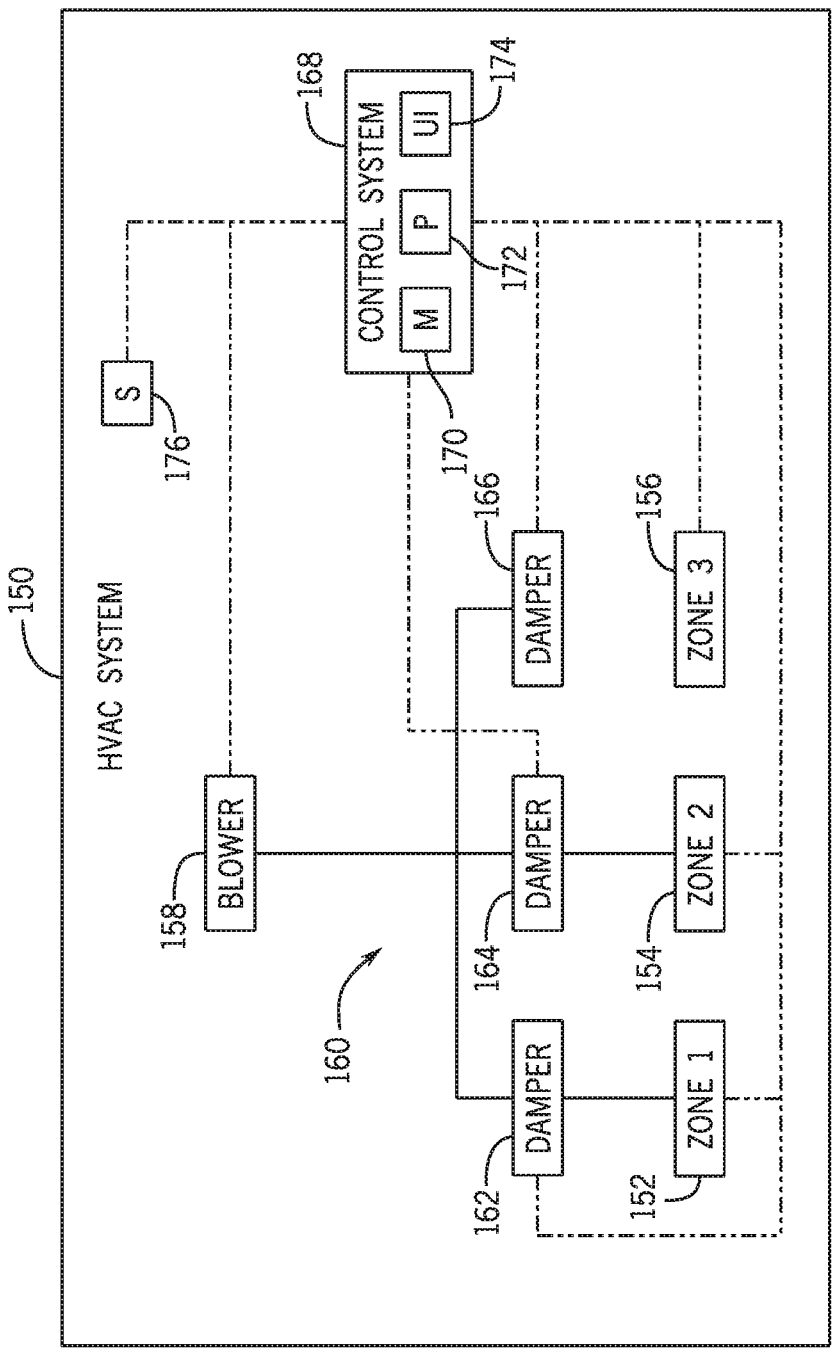
FIG. 5 is a schematic diagram of an embodiment of an HVAC system configured to condition various zones, in accordance with an aspect of the present disclosure.

With this in mind, FIG. 5 is a schematic diagram of an embodiment of an HVAC system 150, which may be a package unit (e.g., the HVAC unit 12), a split system (e.g., the residential heating and cooling system 50), a heat pump, or any other suitable type of HVAC system 150 configured to condition an air flow and to supply the conditioned air flow to a space, such as a room of a structure. The illustrated HVAC system 150 is a zoned HVAC system configured to supply air flow to a first zone 152, a second zone 154, and a third zone 156. However, additional or alternative HVAC systems 150 may supply air flow to any suitable number of zones, such as two zones, five zones, ten zones, and so forth. The HVAC system 150 may have a blower 158 configured to output air flow through ductwork 160 that fluidly couples the blower 158 to the zones 152, 154, 156. As such, the ductwork 160 may route or direct the air flow toward each zone 152, 154, 156. Furthermore, the HVAC system 150 may provide various amounts of conditioning to the zones 152, 154, 156. In an example, the HVAC system 150 may supply cooled air flow to the first zone 152 at a first air flow rate, the HVAC system 150 may supply cooled air flow to the second zone 154 at a second air flow rate that is different than the first air flow rate, and the HVAC system 150 may supply cooled air flow to the third zone 156 at a third air flow rate that is different than the first air flow rate and the second air flow rate. In another example, the HVAC system 150 may supply cooled air flow to the first zone 152, the HVAC system 150 may supply heated air flow to the second zone 154, and the HVAC system 150 may not supply a substantial amount of air flow to the third zone 156. To this end, the ductwork 160 may include a first damper 162 (e.g., a grille, a louver, a duct, a vent, a register) that may be adjustable to regulate an amount of air flow supplied to the first zone 152. Furthermore, the ductwork 160 may include a second damper 164 and a third damper 166 configured to adjustably regulate air flow supplied to the second zone 154 and to the third zone 156, respectively. In this manner, the dampers 162, 164, 166 may be controlled to adjust the amount of air flow supplied to each zone 152, 154, 156, such as to achieve a respective target air flow rate associated with each zone 152, 154, 156 (e.g., based on a respective desirable or target temperature of each zone 152, 154, 156).

For this reason, the HVAC system 150 may further include a control system 168 (e.g., an electronic controller, a cloud-computing system) that may be used to control operation of the HVAC system 150. The control system 168 may include a memory 170 and processing circuitry 172. The memory 170 may include volatile memory, such as random-access memory (RAM), and/or non-volatile memory, such as read-only memory (ROM), optical drives, hard disc drives, solid-state drives, and/or any other non-transitory computer-readable medium that includes instructions to operate the HVAC system 150. The processing circuitry 172 may be configured to execute instructions stored on the memory 170 to control operation of various components of the HVAC system 150. For example, the processing circuitry 172 may include one or more application specific integrated circuits (ASICs), one or more field programmable gate arrays (FPGAs), one or more general purpose processors, or any combination thereof, to operate the HVAC system 150, such as to control an amount of air flow supplied to each zone 152, 154, 156. The control system 168 may further include a user interface 174 with which a user, such as an operator, a technician, a resident, or any other suitable user may interact to cause the control system 168 to operate the HVAC system 150 accordingly. The user interface 174 may, for example, include a touch screen, a button, a dial, a switch, a trackpad, another suitable feature, or any combination thereof, with which the user may interact. For instance, the user may utilize the user interface 174 to cause the HVAC system 150 to condition any of the zones 152, 154, 156. In additional or alternative embodiments, each of the zones 152, 154, 156 may include a respective user interface with which the user may interact to cause the control system 168 to operate the HVAC system 150 (e.g., to condition the corresponding zone 152, 154, 156) accordingly.

In some embodiments, the control system 168 may be communicatively coupled to each damper 162, 164, 166 to enable the control system 168 to adjust a configuration of the dampers 162, 164, 166, thereby controlling the rate and/or amount of air flow supplied into each zone 152, 154, 156. In certain embodiments, the control system 168 may adjust the dampers 162, 164, 166 based on an operating parameter associated with the HVAC system 150. As an example, the operating parameter may include a target condition (e.g., a target temperature, a target humidity) of the zones 152, 154, 156. For instance, if a current condition of the first zone 152 substantially deviates from a target condition of the first zone 152, the control system 168 may output a first control signal to the first damper 162 to enable air flow to be supplied to the first zone 152 at a first (e.g., high) rate. However, if the current condition of the first zone 152 slightly deviates from the target condition of the first zone 152, the control system 168 may output a second control signal to the first damper 162 to enable air flow to be supplied to the first zone 152 at a second (e.g., low) rate. To this end, the HVAC system 150 may include one or more sensors 176 configured to determine the current condition of each zone 152, 154, 156. The sensor(s) 176 may be communicatively coupled to the control system 168 and may transmit sensor data to the control system 168 in order to indicate the respective conditions of each zone 152, 154, 156. Further, the control system 168 may receive an input indicative of the target condition of each zone 152, 154, 156. In certain embodiments, the input may include a user input (e.g., received via the user interface 174). Thus, the user may manually set the target condition of each zone 152, 154, 156. In additional or alternative embodiments, the target condition of each zone 152, 154, 156 may be automatically set. For example, the target conditions may be set based on a time schedule (e.g., a default schedule automatically created upon installation of the HVAC system 150, a schedule manually created by a user), and the control system 168 may automatically set the target condition of the zones 152, 154, 156 based on a current time.

As another example, the operating parameter may include a characteristic of each zone 152, 154, 156. For instance, the characteristic may include a thermal property indicative of an extent to which the zone 152, 154, 156 retains thermal energy (e.g., heat) and/or an extent to which the condition of the zones 152, 154, 156 changes based on a change in thermal energy. In an example, the second zone 154 may include multiple windows, but the first zone 152 may be well insulated such that the second zone 154 may exchange heat with an ambient environment at a greater rate than that of the first zone 152. Thus, the control system 168 may enable air flow to be supplied to the second zone 154 at a greater rate than that supplied to the first zone 152 to compensate for the relatively elevated heat exchanged between the ambient environment and the second zone 154. In an additional example, the first zone 152 may be located at a top floor of a structure, and the second zone 154 may be located at a bottom floor of the structure. The first zone 152 may therefore receive hot air from the second zone 154 because of natural convection. Therefore, the first zone 152 may generally be at a greater temperature than the second zone 154. As such, if heating of each zone 152, 154, 156 is desirable, the control system 168 may enable heated air flow to be supplied to the second zone 154 at a greater rate than that supplied to the first zone 152 because of the relatively elevated temperature of the first zone 152

As a further example, the operating parameter may be associated with a usage of each zone 152, 154, 156. For example, the first zone 152 (e.g., an attic) may not be in use as much as the second zone 154 (e.g., a living room). As such, it may be more desirable to have the condition of the second zone 154 match its corresponding target condition as compared to having the condition of the first zone 152 match its corresponding target condition. Thus, the control system 168 may enable air flow to be supplied at a greater rate to the second zone 154 than that supplied to the first zone 152 so as to provide a more comfortable condition of the second zone 154, because of the increased usage of the second zone 154 compared to the first zone 152.

As yet another example, the operating parameter may be associated with a specification of equipment for each zone 152, 154, 156. That is, certain equipment of the HVAC system 150 may be rated such that each zone 152, 154, 156 may receive air flow at a certain rate to enable the HVAC system 150 to perform desirably, such as to condition the zones 152, 154, 156 efficiently, to reduce an amount of generated sound, to limit an amount of energy consumption, to maintain a structural integrity of equipment, and the like. For instance, the control system 168 may limit the air flow that is supplied to each zone 152, 154, 156 to be below a predetermined air flow rate based on the respective equipment associated with the zones 152, 154, 156.

In certain embodiments, the respective air flow rates for each zone 152, 154, 156 may be based on values indicated during installation of the HVAC system 150. Such indicated air flow rates may be manually designated, such as by a user input from an installer, and/or automatically designated, such as based on sensor data from the sensor 176 and/or on cloud data. For example, during installation of the HVAC system 150, suitable air flow rates associated with each zone 152, 154, 156 may be determined, such as based on equipment of the HVAC system 150, a geographical location of the installation site of the HVAC system 150, and/or characteristics of each zone 152, 154, 156. Thus, the air flow rates for each zone 152, 154, 156 may be indicated during installation, and the control system 168 may operate the HVAC system 150 according to the indicated air flow rates after installation.

It may also be desirable for the total indicated air flow rate to be substantially equal to (e.g., within a threshold range around) a total or actual output air flow rate (e.g., an air flow rate that the blower 158 is configured to deliver) in order for the HVAC system 150 to operate efficiently. As used herein, the total output air flow rate refers to a value or amount of a rate of air flow to be distributed to the zones of the HVAC system 150 in order to maintain desirable operation of the HVAC system 150. The control system 168 may adjust the indicated air flow rates based on the total output air flow rate. By way of example, the control system 168 may increase or decrease the indicated air flow rates to respective, adjusted air flow rates such that a sum of the adjusted air flow rates may substantially match the total output air flow rate.

Furthermore, certain operations of the HVAC system 150 may include an excess air flow condition (e.g., a bleed air flow condition). As used herein, an excess air flow condition occurs when the air flow output by the blower 158 is greater than a sum of air flows to be received by the zones (e.g., the zones to be actively conditioned). In other words, there is excess air flow output by the blower 158. For instance, the blower 158 may be configured to supply a first amount of air flow, but only the first zone 152 is to be conditioned and therefore receive air flow, while the second zone 154 and the third zone 156 do not have to be conditioned and therefore do not have to receive air flow. Thus, air flow may be supplied to the first zone 152 at a second air flow rate, but there may still be excess air flow output by the blower 158. As a result, the control system 168 may cause the HVAC system 150 to operate to increase the air flow supplied to the first zone 152 from the second air flow rate to a third air flow rate, and/or the control system 168 may enable air flow to be supplied to the second zone 154 and/or to the third zone 156 in order to distribute the excess air flow output by the blower 158. That is, during the excess air flow condition, the control system 168 may distribute the excess air flow output by the blower 158 to any of the zones 152, 154, 156 in order to maintain desirable operation of the HVAC system 150.

FIG. 6 is a table 200 illustrating various air flow rates associated with respective zones 202, which may be conditioned by the HVAC system 150, in order to show possible adjustments made to air flows (e.g., by the control system 168) based on the techniques described herein. The table 200 includes eight zones 202, but in additional or alternative embodiments, there may be any suitable number of zones 202 conditioned by the HVAC system 150. Each of the zones 202 may be designated with a respective indicated air flow rate 204, such as via a user input, sensor data, cloud data, and/or any other suitable indication. Each indicated air flow rate 204 may be associated with rate of air flow supplied to the corresponding zone 202 during conditioning as designated based on the indication. The sum of the indicated air flow rates 204 establishes a total indicated air flow rate 206, which may be a total rate of air flow that may be supplied when each zone 202 is being conditioned at the associated indicated air flow rate 206. However, in some embodiments, the total indicated air flow rate 206 may not be a desirable value or amount. For example, a determination may be made as to whether the total indicated air flow rate 206 matches with the total output air flow rate, which may indicate a desired amount of air flow to be supplied to the zones 202 during conditioning. Based on the comparison, an adjustment value 208 may be determined. The adjustment value 208 may be applied to each of the indicated air flow rates 204 to establish a respective adjusted air flow rate 210. Each adjusted air flow rate 210 may indicate an updated rate of air flow to be supplied to each of the zones 202 during conditioning, and the sum of the adjusted air flow rates 210 establishes a total adjusted air flow rate 212. For instance, the total adjusted air flow rate 212 may more accurately reflect the actual total output air flow rate. As a result, during conditioning, the control system 168 may enable air flow to be delivered at the corresponding adjusted air flow rates 210 to maintain a desirable operation of the HVAC system 150.

In certain examples, the adjustment value 208 includes a percentage difference indicative of a ratio between the total output air flow rate and the total indicated air flow rate 206. Thus, offsetting or multiplying each indicated air flow rate 206 by the ratio establishes the adjusted air flow rates 210 that establishes a total adjusted air flow rate 212 substantially equal to or within a threshold range around the total output air flow rate. However, in additional or alternative embodiments, the adjustment value 208 may be associated with any suitable value with which the indicated air flow rates 204 may be adjusted, and the resulting total adjusted air flow rate 212 may be equal to a different air flow rate value.

Each zone 202 may further be associated with a respective excess air flow rate 214. The excess air flow rates 214 indicate a respective additional rate of air flow that may be supplied to each zone 202 during the excess air flow condition. The excess air flow rates 214 may be determined based on the adjusted air flow rates 210 and an excess air flow value 216. For instance, the excess air flow rates 214 may enable excess air flow to be distributed to the zones 202 without substantially affecting the current condition of each zone 202 (e.g., without substantially changing the temperature of each zone 202), without reducing a comfort level of each zone 202, without affecting a structural integrity of the equipment associated with each zone 202, without impacting another aspect of the HVAC system 150, or any combination thereof. As such, the excess air flow value 216 may be determined during manufacture, development, installation, and/or operation of the HVAC system 150. For instance, the excess air flow value 216 may be based on equipment specification, a characteristic (e.g., a size, a location, a thermal resistance, a usage) of each zone 202, a characteristic (e.g., a size, a geographic location) of the HVAC system 150, a user input, another suitable parameter, or any combination thereof. By way of example, the excess air flow value 216 may be a portion, such as 20 percent, 40 percent, 60 percent, or any suitable percentage, of the corresponding adjusted air flow rate 210, the excess air flow value 216 may be another modification of the adjusted air flow rates 210, the excess air flow value 216 may be a predetermined value that is not based on the adjusted air flow rates 210, or any combination thereof. In certain embodiments, the excess air flow value 216 may be dynamically adjustable. That is, the excess air flow value 216 may change, such as based on a determined change of a parameter of the HVAC system 150 (e.g., as indicated by inputs of a user or sensed by sensor data). In further embodiments, the zones 202 may be associated with excess air flow values 216 determined in different manners. Indeed, the excess air flow rates 214 may be determined in any suitable manner to enable desirable operation of the HVAC system 150 during the excess air flow condition.

Each zone 202 may, therefore, be associated with an adjusted plus excess air flow rate 218 indicative of an upper rate level or limit of air flow that may be supplied to the zones, such as during conditioning and during the excess air flow condition of the corresponding zones 202. For example, each adjusted plus excess air flow rate 218 may indicate an air flow rate under which it is desirable for air flow to be supplied to the corresponding zone 202 at any operation of the HVAC system 150. If each excess air flow rate 214 is adjusted using an excess air flow value 216 that is a percentage of the adjusted air flow rates 210, the sum of the adjusted plus excess air flow rates 218 may establish a total adjusted plus excess air flow rate 220 that is greater than the total adjusted air flow rate 212 by the excess air flow value 216. That is, for example, if the excess air flow value 216 is 60 percent of the adjusted air flow rates 210, the total adjusted plus excess air flow rate 220 may be greater than the total adjusted air flow rate 212 by 60 percent. In this way, the total adjusted plus excess air flow rate 220 indicates the amount of air flow that may be supplied if air flow is supplied to each of the zones 202 for conditioning and for distributing excess air flow.

In some embodiments, implementation of the air flow rates associated with the excess air flow condition may be selectively enabled or disabled. Accordingly, operation of the HVAC system 150 to accommodate excess air flow may be adjustably actuated, such as by a user. If implementation of such air flow rates is enabled, the control system 168 may operate the HVAC system 150 to increase air flow into the zones 202 based on the excess air flow rates 214 during the excess air flow condition. However, if implementation of the excess air flow rates 214 is not enabled, the control system 168 may operate the HVAC system 150 to accommodate excess air flow without increasing air flow into the zones 202 based on the excess air flow rates 214 during the excess air flow condition. For example, the HVAC system 150 may, instead, direct the excess air flow back to the blower 158 without supplying the excess air flow to any of the zones 202.

Furthermore, in certain embodiments, the total adjusted air flow rate 212 may be dynamically variable during operation of the HVAC system 150. That is, there may be different amounts or rates of air flow available for supply to the zones 202 in various operations of the HVAC system 150. For instance, the blower 158 may be a variable speed blower configured to operate based on different settings or parameters (e.g., different fan speeds) to output air flow at different rates. Additionally or alternatively, there may be several blowers that may be selectively operated to adjust the amount of output air flow. For this reason, there may be multiple adjusted air flow rates 210, excess air flow rates 214, and adjusted plus excess air flow rates based on the particular available air flow for supply. As an example, the blower 158 may be configured to output a first (e.g., low) total output air flow rate in a first operation, and the control system 168 may determine first adjusted air flow rates, first excess air flow rates, and/or first adjusted plus excess air flow rates based on the first total output air flow rate of the blower 158. The blower 158 may also be configured to output a second (e.g., high) total output flow rate in a second operation, and the control system 168 may determine second adjusted air flow rates, second excess air flow rates, and/or second adjusted plus excess air flow rates based on the second total output air flow rate of the blower 158. In this way, the values of the table 200 may be dynamically adjusted (e.g., by the control system 168) based on the total output air flow rate in effect.

Figure 7:
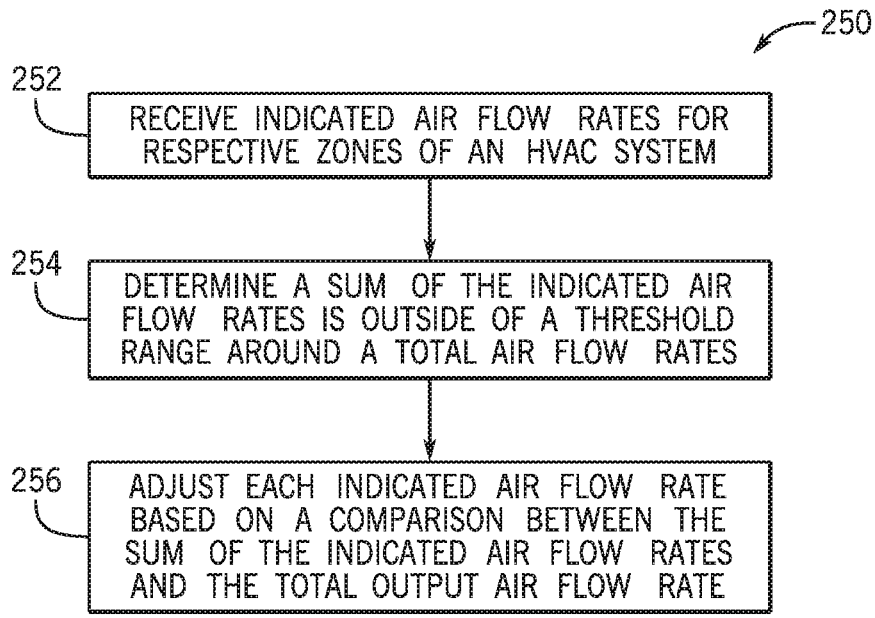
FIG. 7 is a flowchart of an embodiment of a method for adjusting indicated air flow rates of an HVAC system, in accordance with an aspect of the present disclosure.
Figure 8:
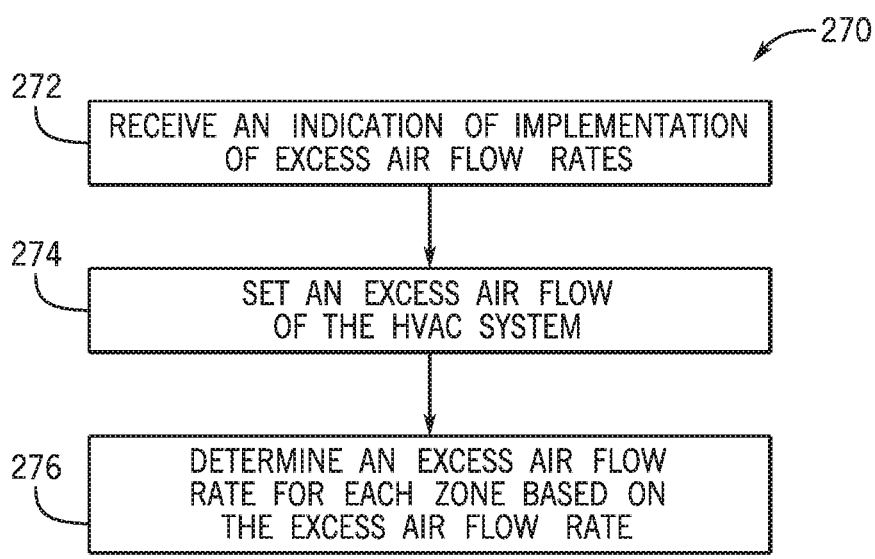
FIG. 8 is a flowchart of an embodiment of a method or process for setting air flow rates of an HVAC system for an excess air flow condition, in accordance with an aspect of the present disclosure.
Figure 9:
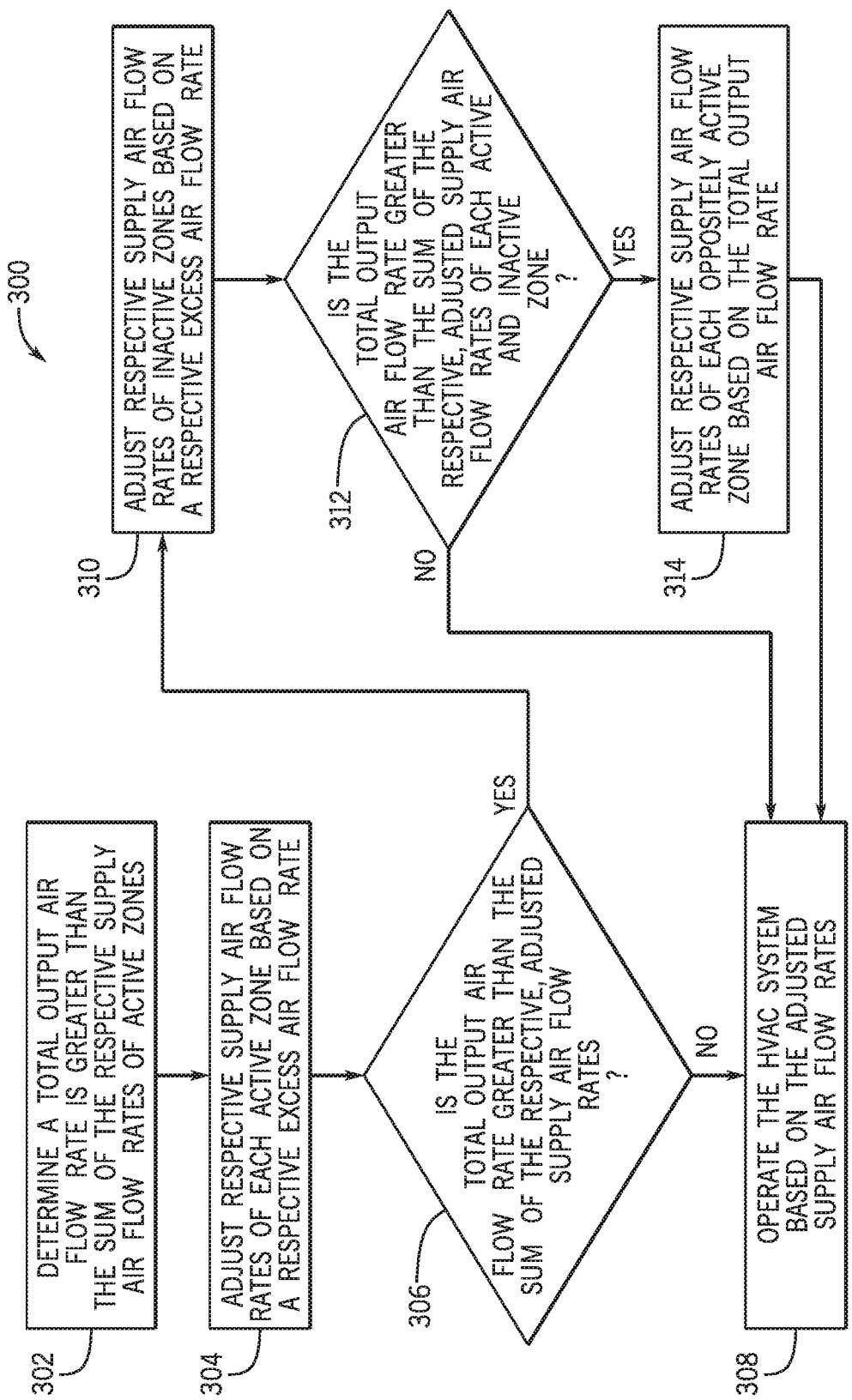
FIG. 9 is a flowchart of an embodiment of a method or process for operating an HVAC system during an excess air flow condition, in accordance with an aspect of the present disclosure.

FIGS. 7-9 each illustrate a method or process in which the HVAC system 150 may be operated. For example, each of the methods may be performed by a control system, such as the control system 168. In certain embodiments, the steps of the method may be performed differently than shown in FIGS. 7-9. For instance, additional steps may be performed, and/or certain steps may be removed, modified, and/or performed in a different order.

FIG. 7 is a block diagram of an embodiment of a method 250 for adjusting indicated air flow rates of the HVAC system. At block 252, indicated air flow rates for respective zones of the HVAC system are received. In certain embodiments, the indicated air flow rates may be received manually via a user input. In additional or alternative embodiments, the indicated air flow rates may be received automatically via data, which may be transmitted via a sensor and/or via a cloud-computing system, for example.

At block 254, a sum of the indicated air flow rates is determined to be outside of a threshold range (e.g., outside of 1 cubic foot per minute, outside of 5 cubic feet per minute, outside of 10 cubic feet per minute) around a total output air flow rate. The total output air flow rate may be associated with an actual total amount of air flow that is available to be distributed and supplied to the zones. For instance, the total output air flow rate may be associated with a total air flow rate that may be output by a blower or by multiple blowers.

At block 256, the indicated air flow rates are adjusted based on a comparison between the sum of the indicated air flow rates and the total output air flow rate. In certain embodiments, the indicated air flow rates may be adjusted such that the sum of the indicated air flow rates substantially matches the total output air flow rate. As an example, if the sum of the indicated air flow rates is substantially below the total output air flow rate, each indicated air flow rate may be increased. As another example, if the sum of the indicated air flow rates is substantially greater than the total output air flow rate, each indicated air flow rate may be decreased. In some embodiments, each indicated air flow rate may be adjusted proportionally (e.g., by the same value). In additional or alternative embodiments, each indicated air flow rate may be adjusted by the same additive or subtractive value. In further embodiments, each indicated air flow rate may be adjusted in a different manner (e.g., a first indicated air flow rate is increased and a second indicated air flow rate is decreased) based on the comparison between the sum of the indicated air flow rates and the total output air flow rate. In any case, the indicated air flow rates may be adjusted to establish respective, adjusted air flow rates for the zones.

FIG. 8 is a block diagram of an embodiment of a method or process 270 for setting air flow rates of the HVAC system for the excess air flow condition. At block 272, an indication of implementation of the excess air flow rates is received. That is, the indication is associated with a desire to operate the HVAC system to increase air flow to the zones during the excess air flow condition. For instance, the indication may be received via a user input (e.g., from an installer). Additionally or alternatively, the indication may be received automatically, such as based on data regarding a specification of equipment of the HVAC system.

At block 274, in response to receipt of the indication of implementation of the excess air flow rates, an excess air flow value of the HVAC system may be set. In certain embodiments, the excess air flow value may be predetermined during development, manufacture, and/or installation of the HVAC system. Thus, the predetermined excess air flow value may be automatically set upon receipt of the indication of implementation of the excess air flow rates. In additional or alternative embodiments, the excess air flow value may be determined after receipt of the indication of implementation of the excess air flow rates, such as based on additional analysis of the HVAC system (e.g., based on user input of the specification of equipment of the HVAC system). The excess air flow value may then be set after such determination is performed.

At block 276, excess air flow rates for each zone may be determined based on the excess air flow value. By way of example, each of the adjusted air flow rates (e.g., determined via the step described with reference to block 256 of the method 250) may be multiplied by the excess air flow value to establish the excess air flow rates. The excess air flow rates represent respective additional air flows that may be supplied to each zone during the excess air flow condition of the HVAC system.

Although this disclosure primarily discusses determining excess air flow rates based on an excess air flow value, in additional or alternative embodiments, excess air flow rates may be determined in another suitable manner. As an example, the excess air flow rates may be based on another calculation or determination performed based on the adjusted air flow rates without setting an excess air flow value. As another example, the excess air flow rates may be based on a predetermined value that does not depend on the adjusted air flow rates. In any case, the excess air flow rates may be determined in any suitable manner to enable excess air flow to be distributed to the zones during the excess air flow condition.

FIG. 9 is a flowchart of an embodiment of a method or process 300 for operating the HVAC system during the excess air flow condition. At block 302, the total output air flow rate is determined to be greater than the sum of the rates of air flows to be supplied to active zones of the HVAC system such that the occurrence of the excess air flow condition is identified. As used herein, an active zone refers to a zone that receives air flow for conditioning by a particular operating mode (e.g., cooling, heating) of the HVAC system, such as upon receipt of a signal that the current condition of the zone does not substantially match with the target condition of the zone. Thus, air flow may be delivered to active zones in response to receipt of a signal indicative that such zones are to be conditioned. The sum of the adjusted air flow may be equal to the total output air flow rate when all of the zones are active. However, in some circumstances, not all of the zones may be active. As a result, there may be excess air flow that is not used for conditioning the active zones at the adjusted air flow rates.

At block 304, in response to the determination that the total output air flow rate is greater than the sum of the rates of air flows supplied to the active zones, the rates of air flows supplied to the active zones may be adjusted based on the excess air flow rates (e.g., determined at block 276 of the method 270). As an example, the respective rates of air flows supplied to the active zones may be increased by the corresponding excess air flow rates. In this manner, excess air flow may be distributed to the active zones such that the active zones may be receiving air flow at the adjusted plus excess air flow rates 218 described with reference to FIG. 6.

At block 306, a determination is made regarding whether the total output air flow rate remains greater than the sum of the rates of air flows supplied to the active zones such that the excess air flow condition is still in occurrence. That is, for example, a determination is made regarding whether the total output air flow rate is greater than the sum of the adjusted plus excess air flow rates of the active zones. If a determination is made that the total output air flow rate is no longer greater than (e.g., is substantially less than) the sum of the rates of air flows supplied to the active zones, the HVAC system may be operated based on the newly determined rates (e.g., the adjusted plus excess air flow rates) of air flows supplied to the active zones, as indicated at block 308. That is, the HVAC system may supply air flow to the active zones based on the corresponding rates established at block 304.

However, if a determination is made that the total output air flow rate is still greater than the sum of the rates of air flows supplied to the active zones, the rates of air flows supplied to inactive zones of the HVAC system may be adjusted, as shown at block 310. As used herein, an inactive zone refers to a zone that may not be receiving a substantial amount of air flow for conditioning purposes. For instance, a current condition of the inactive zone may not substantially deviate from a target or desirable condition of the inactive zone. However, if the total output air flow rate is greater than the sum of the rates of air flows supplied to the active zone, thereby indicating that there is still an excess amount of air flow, at least some of the excess air flow may be supplied to the inactive zones. By way of example, air flow may be supplied to each inactive zone at respective rates substantially equal to the excess air flow rates determined via block 276 of the method 270. In some embodiments, supplying the air flow at the excess air flow rates to the inactive zones may not substantially change the current or desirable condition of the inactive zones.

At block 312, a determination is made regarding whether the total output air flow rate is greater than the sum of the rates of air flows supplied to the active zones and to the inactive zones such that the excess air flow condition is still in occurrence. That is, a determination is made regarding whether there is excess air flow after the air flows supplied to the active zones and to the inactive zones have been increased. If a determination is made that the total output air flow rate is not greater than (e.g., is substantially less than) the sum of the rates of air flows supplied to the active zones and to the inactive zones, the HVAC system may be operated based on such air flow rates.

However, if a determination is made that the total output air flow rate remains greater than the sum of the rates of air flows supplied to the active zones and to the inactive zones, the rates of air flows supplied to oppositely active zones of the HVAC system may be adjusted, as shown at block 314. As used herein, an oppositely active zone refers to a zone that receives air flow conditioned by an operating mode of the HVAC system opposite the operating mode associated with the active zone. For instance, if the active zone is being conditioned via a cooling operating mode, the oppositely active zone may be conditioned via a heating operating mode, and vice versa. In certain embodiments, the remaining excess air flow may be substantially equally distributed to the oppositely active zones. In additional or alternative embodiments, some of the oppositely active zones may receive a greater amount of the excess air flow than other oppositely active zones. For instance, some of the oppositely active zones may receive air flow at the excess air flow rate (e.g., determined via the step at block 276 of the method 270), and a remainder of the oppositely active zones may receive air flow at a substantially lower air flow rate and/or may not receive a substantial amount of air flow. In any case, the remaining excess air flow may be distributed to the oppositely active zones such that there is no longer excess air flow in the HVAC system. As a result, the HVAC system may condition the zones in a desirable manner.

The present disclosure may provide one or more technical effects useful in the operation of an HVAC system. For example, the HVAC system may be configured to supply air flow to various zones at indicated air flow rates. In some embodiments, the indicated air flow rates may be designated during or before installation of the HVAC system, and the sum of the indicated air flow rates may not substantially match a total output air flow rate associated with desirable operation of the HVAC system. As such, the indicated air flow rates may be adjusted such that the sum of the indicated air flow rates substantially matches the total output air flow rate. In addition, the HVAC system may adjust the rate of air flow supplied to the zones when there is excess air flow available. For instance, each zone may be associated with a respective excess air flow rate, which indicates a rate of additional air flow that the zone may receive without substantially affecting a condition of the zones. Thus, supplying the excess air flows to the zones based on the excess air flow rates may reduce the amount of available excess air flow and maintain desirable operation of the HVAC system without substantially impacting a comfort level of the zones. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
   processing circuitry configured to:
   receive a plurality of air flow rates, wherein each air flow rate of the plurality of air flow rates is associated with a respective zone of a plurality of zones of the HVAC system;
   determine a sum of the plurality of air flow rates is outside of a threshold range around a total output air flow rate of air flow to be distributed to the plurality of zones;
   in response to determining the sum of the plurality of air flow rates is outside of the threshold range around the total output air flow rate, adjust an air flow rate of the plurality of air flow rates based on a comparison between the sum of the plurality of air flow rates and the total output air flow rate; and
   operate the HVAC system to deliver air to the plurality of zones based on the plurality of air flow rates and based on adjustment of the air flow rate of the plurality of air flow rates.

2. The HVAC system of claim 1, wherein the processing circuitry is configured to:
   determine a percentage difference between the total output air flow rate relative to the sum of the plurality of air flow rates; and
   adjust the air flow rate of the plurality of air flow rates based on the percentage difference.

3. The HVAC system of claim 2, wherein the processing circuitry is configured to offset the air flow rate of the plurality of air flow rates by the percentage difference between the total output air flow rate relative to the sum of the plurality of air flow rates.

4. The HVAC system of claim 1, wherein the processing circuitry is configured to:
identify an occurrence of an excess air flow condition of the HVAC system; and
operate the HVAC system to supply air flow to the plurality of zones based on a respective excess air flow rate of each zone of the plurality of zones in response to identification of the occurrence of the excess air flow condition.

5. The HVAC system of claim 4, wherein the processing circuitry is configured to adjust each air flow rate of the plurality of air flow rates based on the comparison between the sum of the plurality of air flow rates and the total output air flow rate to establish a plurality of adjusted air flow rates of the plurality of zones, and each respective excess air flow rate is based on a corresponding adjusted air flow rate of the plurality of adjusted air flow rates.

6. The HVAC system of claim 1, wherein the total output air flow rate is associated with an output air flow rate of a blower of the HVAC system.

7. The HVAC system of claim 1, wherein the processing circuitry is configured to receive the plurality of air flow rates via a user input.

8. The HVAC system of claim 1, comprising a sensor communicatively coupled to the processing circuitry, wherein the processing circuitry is configured to receive the plurality of air flow rates via sensor data received from the sensor.

9. A tangible, non-transitory, computer-readable medium with computer-executable instructions that, when executed by processing circuitry, cause the processing circuitry to:
receive a plurality of indicated air flow rates, wherein each indicated air flow rate of the plurality of indicated air flow rates is associated with a respective zone of a plurality of zones of a heating, ventilation, and/or air conditioning (HVAC) system;
determine a sum of the plurality of indicated air flow rates is outside of a threshold range around a total output air flow rate of the HVAC system, wherein the total output air flow rate is associated with total air flow to be distributed to the plurality of zones;
adjust the plurality of indicated air flow rates to establish a plurality of adjusted air flow rates in response to the determination that the sum of the plurality of indicated air flow rates is outside of the threshold range around the total output air flow rate; and
operate the HVAC system to deliver respective air flows to the plurality of zones based on the plurality of adjusted air flow rates.

10. The tangible, non-transitory, computer-readable medium of claim 9, wherein the computer-executable instructions, when executed by the processing circuitry, cause the processing circuitry to:
receive an indication of implementation of a plurality of excess air flow rates;
determine an excess air flow value in response to receipt of the indication of implementation of the plurality of excess air flow rates; and
determine a respective excess air flow rate for each zone of the plurality of zones based on the excess air flow value to implement the plurality of excess air flow rates.

11. The tangible, non-transitory, computer-readable medium of claim 10, wherein the computer-executable instructions, when executed by the processing circuitry, cause the processing circuitry to receive the indication of implementation of the plurality of excess air flow rates via a user input.

12. The tangible, non-transitory, computer-readable medium of claim 10, wherein the computer-executable instructions, when executed by the processing circuitry, cause the processing circuitry to determine the excess air flow value based on equipment specification of the HVAC system, a characteristic of the plurality of zones, a characteristic of the HVAC system, a user input, or any combination thereof.

13. The tangible, non-transitory, computer-readable medium of claim 10, wherein the computer-executable instructions, when executed by the processing circuitry, cause the processing circuitry to:
identify an occurrence of an excess air flow condition; and
increase air flow supplied to active zones of the plurality of zones based on first excess air flow rates of the plurality of excess air flow rates corresponding to the active zones in response to identification of the occurrence of the excess air flow condition.

14. The tangible, non-transitory, computer-readable medium of claim 13, wherein the computer-executable instructions, when executed by the processing circuitry, cause the processing circuitry to:
identify the excess air flow condition is still in occurrence after increasing air flow supplied to the active zones of the plurality of zones; and
increase air flow supplied to inactive zones of the plurality of zones based on second excess air flow rates of the plurality of excess air flow rates corresponding to the inactive zones in response to identification that the excess air flow condition is still in occurrence.

15. The tangible, non-transitory, computer-readable medium of claim 14, wherein the computer-executable instructions, when executed by the processing circuitry, cause the processing circuitry to:
identify the excess air flow condition is still in occurrence after increasing air flow supplied to the inactive zones of the plurality of zones; and
increase air flow supplied to oppositely active zones of the plurality of zones based on third excess air flow rates of the plurality of excess air flow rates corresponding to the oppositely active zones in response to identification that the excess air flow condition is still in occurrence.

16. A heating, ventilation, and/or air conditioning (HVAC) system, comprising:
a blower configured to output an air flow at an output air flow rate;
ductwork fluidly coupling the blower to a plurality of zones of the HVAC system, wherein the ductwork is configured to distribute the air flow output at the output air flow rate by the blower to the plurality of zones; and
a control system configured to:
receive a plurality of indicated air flow rates, wherein each indicated air flow rate of the plurality of indicated air flow rates is associated with a respective zone of the plurality of zones of the HVAC system;
determine a sum of the plurality of indicated air flow rates is outside of a threshold range around the output air flow rate;
adjust the plurality of indicated air flow rates to establish a plurality of adjusted air flow rates in response to determining the sum of the plurality of indicated air flow rates is outside of the threshold range around the output air flow rate; and operate the HVAC system to enable the air flow output by the blower to be supplied to each zone of the plurality of zones based on the plurality of adjusted air flow rates.

17. The HVAC system of claim 16, wherein the control system is configured to operate the HVAC system to supply the air flow to each zone of the plurality of zones at respective, corresponding adjusted air flow rates of the plurality of adjusted air flow rates in response to receipt of a signal indicative of conditioning the zones of the plurality of zones.

18. The HVAC system of claim 17, wherein the control system is configured to:

operate the HVAC system to supply the air flow to each zone of the plurality of zones to establish a set of supply air flow rates;

compare a sum of the set of supply air flow rates with the output air flow rate;

identify an occurrence of an excess air flow condition in response to determining that the output air flow rate is greater than the sum of the set of supply air flow rates; and adjust the set of supply air flow rates based on a set of excess air flow rates in response to identifying the occurrence of the excess air flow condition.

19. The HVAC system of claim 18, wherein each excess air flow rate of the set of excess air flow rates is a portion of a corresponding adjusted air flow rate of the plurality of adjusted air flow rates, a modification of the corresponding adjusted air flow rate of the plurality of adjusted air flow rates, a predetermined value, or any combination thereof.

20. The HVAC system of claim 16, wherein the ductwork comprises a plurality of dampers, each damper of the plurality of dampers is associated with at least one zone of the plurality of zones, and the control system is configured to operate the plurality of dampers based on the plurality of adjusted air flow rates.

* * * * *